United States Patent [19]

Hoffmann et al.

[11] Patent Number: 5,363,689
[45] Date of Patent: Nov. 15, 1994

[54] CALIBRATION DEVICE FOR LEAK DETECTING INSTRUMENTS

[75] Inventors: Jacques E. Hoffmann; David J. Balke, both of Chicago, Ill.

[73] Assignee: Intertech Development Company, Skokie, Ill.

[21] Appl. No.: 943,490

[22] Filed: Sep. 11, 1992

[51] Int. Cl.$^5$ ............................................. G01F 25/00
[52] U.S. Cl. ......................................................... 73/3
[58] Field of Search ................... 73/1 G, 3, 198, 199, 73/201, 204.11, 204.15–204.19, 204.22, 204.23, 204.25, 204.27, 861.79, 273, 3

[56] References Cited

U.S. PATENT DOCUMENTS

| | | | |
|---|---|---|---|
| Re. 33,076 | 10/1989 | Sigiura | 73/204.19 |
| 900,479 | 10/1908 | Burhorn | 73/201 |
| 2,123,656 | 7/1938 | Miller | 73/198 |
| 3,015,232 | 1/1962 | Schnoll | 73/204.25 |
| 3,783,248 | 1/1974 | Sugden, Jr. | 73/3 |
| 3,813,940 | 6/1974 | Sommer | 73/198 |
| 4,096,746 | 6/1978 | Wilson et al. | 73/205 |
| 4,244,217 | 1/1981 | Ledbetter | 73/204.27 |
| 4,565,092 | 1/1986 | Kompelien | 73/202 |
| 4,658,829 | 4/1987 | Wallace | 128/672 |
| 4,671,097 | 6/1987 | Kurki et al. | 73/3 |
| 4,811,252 | 3/1989 | Furuse | 364/556 |
| 4,945,754 | 8/1990 | Wissman, Jr. et al. | 73/3 |
| 4,991,426 | 2/1991 | Evans | 73/40.7 |
| 5,072,416 | 12/1991 | Francisco, Jr. et al. | 364/571.01 |
| 5,076,099 | 12/1991 | Hisanaga et al. | 73/3 |
| 5,092,158 | 3/1992 | Tuma et al. | 73/3 |
| 5,146,782 | 9/1992 | Rasmussen | 73/273 |

OTHER PUBLICATIONS

Product specification for "DP-176BL & DP-176SBL Series Battery Operated 3-½ Digit Backlit LCD Voltage Input DPM", by Acculex, A Metrabyte Company, p. 18, undated.

Design Specification for "Brooks NRS* Needle Control Valves Models 8503 and 8504", 3 pp., dated Feb., 1984, copyright by Brooks Instrument Div., Emerson Electric Co., Hatfield, Pa.

"Installation Instructions for Microbridge Mass Airflow Sensor", PK 8854, 4 pp., by Micro Switch, a Honeywell Division, Mar., 1990.

*Primary Examiner*—Robert Raevis
*Attorney, Agent, or Firm*—Fitch, Even, Tabin & Flannery

[57] ABSTRACT

A leak detector calibration device for generating a leak standard and for calibrating leak detecting instruments. The leak detector calibration device includes a flow control valve, a transducer, an amplifier module, and a display module, all operating from a 9 volt supply. This configuration is a compact, hand-held instrument for use in a manufacturing environment. The device is highly accurate and uses a mass flow sensor sensitive to measurement of low flow rates. The need for fragile glass orifices or clumsy soap film flowmeters present used to calibrate leak detecting instruments is eliminated. In addition, the device can be used not only to generate a leak standard to calibrate positive flow leak detectors, but can also be used to generate a leak standard for negative flow or vacuum type leak detectors.

17 Claims, 5 Drawing Sheets

Serial Number: _______________  Barometer: In Hg ___ 30.27
Calibration Date: _______________  Temperature: Degr C ___ 24.5
　　　　　　　　　　　　　　　　　Manometer: In Water ___ 1.44

Volume Correction Factor "K" = 　0.999841

At 31 PSI

| | Nominal Reading | CalMaster Reading | NIST Standard (time for 10 ccm) | True Flow in CCM | Difference in ccm | Deviation % F. S. |
|---|---|---|---|---|---|---|
| | 20 | 19.83 | 31.24 | 19.20 | 0.63 | 3.13 |
| | 15 | 15.07 | 40.32 | 14.88 | 0.19 | 0.96 |
| | 10 | 10.01 | 60.11 | 9.98 | 0.03 | 0.15 |
| | 5 | 5.03 | 119.92 | 5.00 | 0.03 | 0.14 |
| | 1 | 1.01 | 592.90 | 1.01 | -0.00 | -0.01 |
| Time for 5 CCM | 0.5 | 0.49 | 610.81 | 0.49 | -0.00 | -0.01 |
| Time for 1 CCM | 0.1 | 0.11 | 564.01 | 0.11 | 0.00 | 0.02 |

At 10.5 PSI

| | Nominal Reading | CalMaster Reading | NIST Standard (time for 10 ccm) | True Flow in CCM | Difference in ccm | Deviation % F. S. |
|---|---|---|---|---|---|---|
| | 20 | 19.83 | 30.38 | 19.75 | 0.08 | 0.42 |
| | 15 | 15.08 | 40.31 | 14.88 | 0.20 | 0.99 |
| | 10 | 10.01 | 60.36 | 9.94 | 0.07 | 0.36 |
| | 5 | 5.00 | 120.40 | 4.98 | 0.02 | 0.09 |
| | 1 | 1.04 | 576.42 | 1.04 | -0.00 | -0.00 |
| Time for 5 CCM | 0.5 | 0.52 | 584.14 | 0.51 | 0.01 | 0.03 |
| Time for 1 CCM | 0.1 | 0.12 | 517.99 | 0.12 | 0.00 | 0.02 |

CALIBRATION DEVICE FOR LEAK DETECTING INSTRUMENTS

FIELD OF THE INVENTION

The present invention relates to a calibration device for calibrating leak detecting instruments. In particular, the calibration device creates a leak standard from a supply of pressurized gas. The leak standard is used to calibrate positive pressure or negative pressure (vacuum) leak detecting instruments.

BACKGROUND OF THE INVENTION

Leak detecting instruments are used in a variety of industries to determine whether products are properly manufactured and assembled. Leak detecting instruments are used to test products for the presence of leaks which degrade the performance of the product during the product's useful life. Not all leaks are fatal to the performance of a product and a maximum acceptable leak is often established for a product. Consequently, leak detecting instruments must be able to distinguish between leaks which fall above or below the maximum acceptable leak.

Because leak detecting instruments not only detect leaks but measure the amount of leakage as well, leak detecting instruments are calibrated to accurately measure the amount of leak from a part being tested. Leak detecting instruments are therefore calibrated to a leak standard providing a known amount of flow. The leak standard establishes a known flow rate which is used to calibrate the sensing apparatus of the leak detection equipment measuring leakage, thereby ensuring that the leak detection equipment accurately measures the amount of leak present in the parts being tested. Devices measuring flow rate are used to establish the leak standard.

One particular type of device used to measure flow rate is a soap film flowmeter. The soap film flowmeter consists of a precision glass tube with graduations marking specific volumes referenced to a zero point. The bottom portion of the tube is closed to create a reservoir containing a soap solution. The soap film flowmeter is connected to a flow control needle valve. A source of pressurized air or gas is connected to an input of the needle valve and the output is connected to an input located at the bottom portion of the soap film flowmeter. Pressurized air or gas is injected into the tube through the needle valve below the surface of the soap solution. As air flows into the tube, a bubble is formed and rises in the tube. Flow rate is determined by measuring the travel time of the bubble between the reference zero point and a known graduation mark. The volume traversed by the bubble is divided by the travel time to arrive at a flow rate.

Most leak detecting instruments are provided with a quick-connect fitting or calibration port in the test part pressurization line to facilitate insertion of a leak standard. Typically, an input of a flow control needle valve is attached to the quick-connect fitting. To set a calibrated leak using a soap film flowmeter, an outlet of the needle valve is connected to the soap film flowmeter. As air flows through the needle valve and into the flowmeter, a soap bubble is formed. The needle valve is adjusted until the resultant flow causes the bubble to traverse the tube for a period of time corresponding to the desired flow rate. In this way, the flow control needle valve provides a measured amount of flow for use as a leak standard.

While soap film flowmeters are used to establish a leak standard, soap film flowmeters have certain disadvantages. For instance, the accuracy of the measured flow rate is extremely dependent upon the operator using the device. Because the travel time of a bubble passing from one graduation to another indicates flow rate, the operator must observe when the bubble passes each graduation. If the operator misjudges when the bubble passes either graduation, the reading of flow is not accurate.

The soap film flowmeter must also be placed on a perfectly level surface to yield accurate measurements since the surface of the soap solution must be parallel to the graduation marks to yield accurate readings. In addition, the glass tube is an inherently fragile device requiring extra care which is not always easy to supply in the often hostile production environment.

Another type of device used to measure flow rate is a rotameter. Rotameters are variable area flowmeters which include a container having an input and output connection for holding a fluid into which a positionable restrictor is placed. The restrictor is displaced in the fluid by an applied flow of gas or air to the input. The restrictor moves to a position dictated by the gas flow-through. The position of the restrictor is dependant upon gravity or gravity supplemented with a spring resistance to provide essentially a constant differential pressure.

One type of rotameter is a tapered-tube rotameter in which gas flows upwardly through a tapered tube, lifting a shaped weight or float to a position where the upward fluid force just balances the float weight, thereby giving a float position that indicates flow rate. The position of the float is determined by ascertaining where the float is positioned within the tube, typically marked by graduation lines. The position of the float can also be electronically determined in situations where the float carries the core of an inductance pickup for transmission of the float position through a nonmagnetic tube seal.

The rotameter suffers some of the same disadvantages as the soap film flowmeter in that accurate readings are dependant upon the proper volume and surface level of the included liquid. In addition, the rotameter, like the soap film flowmeter, is an inherently fragile device requiring extra care due to its size and shape.

Fixed and variable orifices are also used to establish leak standards. The orifice is connected to the flowmeter and controls the rate of air flow measured by the flowmeter. Fixed orifices can only be used for a specific leakage value at a specified pressure. Calibration at other values requires the use of different fixed orifices. These orifices are fragile, nonrenewable, and subject to clogging from contamination. In particular, once the fixed orifice is calibrated by a rotameter or flowmeter, it is removed from the rotameter or flowmeter and used as the leak standard. After removal, the flow from the orifice is no longer continuously monitored, and any change in flow due to clogging or any other change in orifice size after proper adjustment goes undetected. Consequently, once the fixed or variable orifice is calibrated in this fashion, the operator cannot be certain that the leak standard remains at the same value as calibrated.

Variable orifices or needle valves can be used at various leak rates and pressure conditions, but each time the orifice setting is changed, the variable orifice must be recalibrated. This is a lengthy, complex process requiring skill and knowledge. Not only must an operator connect the variable orifice to the rotameter or flowmeter, the operator must exercise a great amount of caution in connecting the orifice to the rotameter or flowmeters, due to their fragileness. Once connected, the operator must make sure that the flowmeter is level, and that the timing of bubble flow or the reading of the level of the float is made accurately. Even after the orifice is calibrated, the operator has no way of knowing whether the calibrated flow through the orifice remains at the proper value.

SUMMARY OF THE INVENTION

The present invention is a calibration device for quickly and accurately calibrating leak detecting instruments or devices. The calibration device controls the flow rate of a gas or air and measures the controlled flow. The leak detector calibration device is a unified, handheld device having a single housing which is both portable and rugged. The present invention includes an easy-to-read digital readout which requires no operator judgement to determine the value of the flow rate as is necessary in the soap film flowmeter and the rotameter. The device is a precision flow source which provides a nearly instantaneous reading of flow. Delicate mechanical movements are eliminated as well as the effects of orifices subject to clogging from contamination.

The leak detector calibration device establishes a known flow of air as a leak source for use as a leak standard to calibrate leak detecting devices. An inlet port of the leak detection calibration device is connected to a source of pressurized air. The amount of air passing through the calibration device is controlled and fixed by a precision needle valve connected to the inlet port. The fixed amount of air passes through a mass flow transducer which senses the rate of air flow through the needle valve and exiting an outlet port of the device. The mass flow transducer generates a signal corresponding to the rate of sensed air flow. This signal is converted to one for display on a digital readout. Because air flow is continuously measured and displayed, the present invention is not subject to the problems of contamination, nor does the present invention require the performance of a complex series of steps to perform a calibration.

The leak detector calibration device generates a number of different leak standards. A manually operated adjustment knob attached to the needle valve is adjusted until the proper value of flow is displayed on the digital display readout. The adjustment knob enables an operator to check several different leak rates with ease.

To calibrate a positive pressure type of leak detecting instrument, the inlet port of the leak detector calibration device is connected to the quick connect fitting or calibration port in a test port pressurization line of the leak detecting instrument. The outlet port of the calibration device is left unconnected to vent air flow to atmosphere. Air flow exiting the quick connect fitting is measured and displayed on an adjustable flow rate indicator or display of the leak detecting instrument. At the same time, a reading of the air flow is displayed on the leak detector calibration device. The air flow through the leak detector calibration device is then adjusted to a desired value by observing the reading of flow displayed on the digital readout.

Once the desired standard is established, the reading on the calibration device is compared to the reading on the adjustable flow rate indicator of the leak detecting instrument. If the readings are different, the displayed reading on the flow rate indicator of the leak detecting instrument is adjusted until it matches the reading displayed on the calibration device.

The leak detector calibration device can also be used to calibrate vacuum type leak detectors. Calibration is performed as before, except that the vacuum source is connected to the outlet port of the leak detecting calibrator.

In particular, the present invention includes an adjustable needle valve, a mass flow transducer to measure the flow of air, and a digital display readout for displaying leak rate.

DETAILED DESCRIPTION OF THE PREFERRED EMBODIMENT

Figure 1:
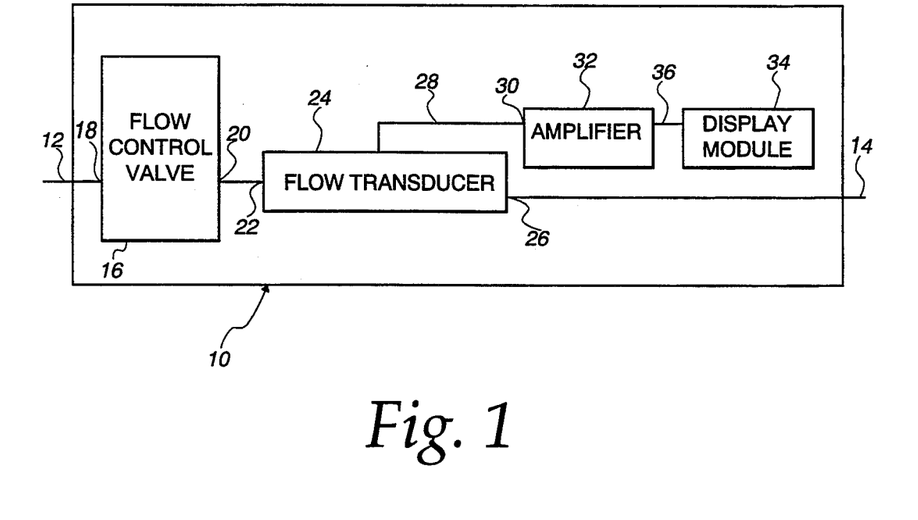
FIG. 1 illustrates a general block diagram of the present invention.

Referring now to FIG. 1, a block diagram of a calibration device for leak detecting instruments or a leak detector calibrator embodying the present invention is designated by the numeral 10. The leak detector calibrator 10 includes an inlet port 12 which provides a means of external connection and an outlet port 14 also providing a means of external connection to the device 10. The inlet port 12 is connected to a flow control valve 16 having a first connecting port 18 and a second connecting port 20. The flow control valve 16 is preferably an adjustable needle valve having an adjustable orifice for controlling the amount of air or gas flowing from the first connecting port 18 to the second connecting port 20. In particular, the adjustable needle valve is designed for precisely producing low flow rates on the order of from zero to 150 cubic centimeters/minute (cc/m) at 10 psig. The present embodiment uses non-rising stem (NRS) needle control valve, Model 8504, needle taper No. 1, sold by Brooks Instrument Division, Emerson Electric Company, Hatfield, Pa. While the needle valves can control flow in either direction, in the present invention, air flow is in a single direction. Other needle control valves can also be used.

The second connecting port 20 of the flow control valve 16 is connected to a first transducer port 22 of a flow transducer 24. The flow transducer 24 has a second transducer port 26 connected to the outlet port 14. The flow transducer 24 senses the flow rate of a gas flowing from the first transducer port 22 to the second transducer port 26 and produces an electrical signal on a signal conductor 28 representative of the amount of flow passing therethrough. The signal conductor 28 is connected to an amplifier input 30 of an amplifier 32.

The amplifier 32 amplifies the flow signal to drive a display module 34 over a conductor 36.

Figure 2:
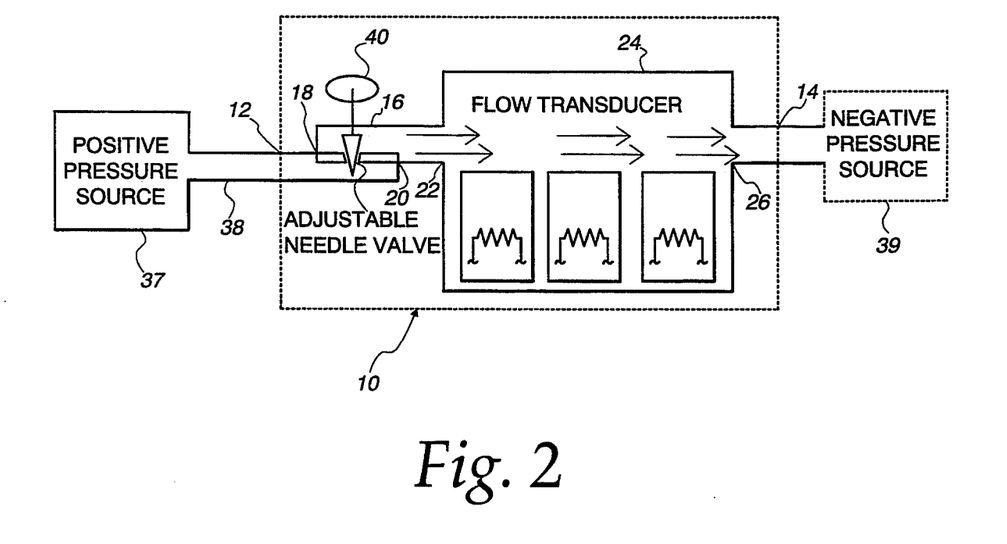
FIG. 2 illustrates a general flow schematic of the present invention.

FIG. 2 illustrates an air or gas flow schematic illustrating the flow of air or gas through the leak detector apparatus 10. The present invention can be used to calibrate positive pressure leak detecting instruments or negative pressure (vacuum) leak detecting instruments. In the case of a positive pressure leak detecting instrument, a positive pressure source 37 having an output 38 is connected to the inlet port 12 of the device 10. Air or gas flows from the first connecting port 18 to the second connecting port 20 of the flow control valve 16 and through the first transducer port 22 to the second transducer port 26 of the flow transducer 24 and out through the outlet port 14. The flow control valve 16 includes an adjusting means 40 for adjusting the flow rate therethrough.

The present invention is also used to calibrate vacuum type leak detectors. In this situation, however, the positive pressure source 37 is not used and a negative pressure source 39 is instead connected to the outlet port 14 of the device 10. Flow is still from the inlet port 12 to the outlet port 14, however, due to the presence of the vacuum.

Figure 3:
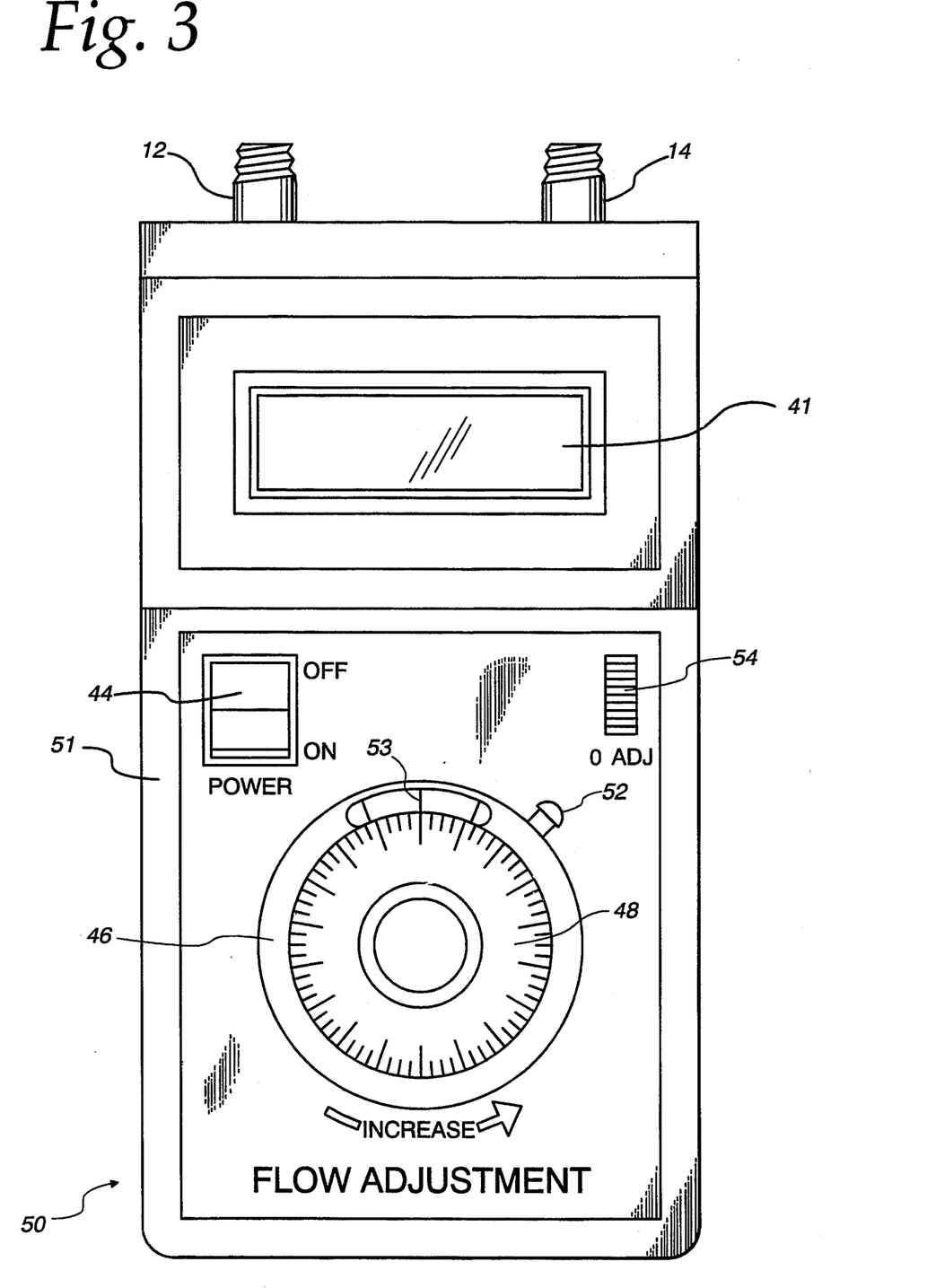
FIG. 3 is a front view of a hand-held leak detector calibrator of the present invention.

FIG. 3 illustrates a front view of an electronic hand-held leak detector calibrator of the present invention. A housing 51 encloses the fluid flow apparatus and electronic circuitry needed for the leak detector. The hand-held device 50 includes the inlet port 12, the outlet port 14, and a display 41 of the display module 34. Each of the ports 12 and 14 includes a screw-type fitting for connection thereto. The display is a digital readout type of display and can be either the LED or LCD type.

The hand-held device 50 also includes a number of operator adjustable controls. A power switch 44 is included for turning on and off the device. A flow-adjustment control means 46 is coupled to the adjusting means 40 for adjusting the orifice size of the adjustable needle valve 16. The flow adjustment control means 46 includes a dial 48 having graduations for adjusting the flow against a reference point 53. The graduations indicate the relative position of the dial 48, so that desired flow rates are set according to the readings of flow displayed on the display 41. Also included is a locking means 52 or mechanical brake which holds the dial 48 and the adjusted flow at the value displayed on the display 41 once the desired flow has been selected. A zero adjustment means 54 is used to adjust the digital display readout to zero to calibrate the hand-held device 50 when no air flow is present.

Figure 6:
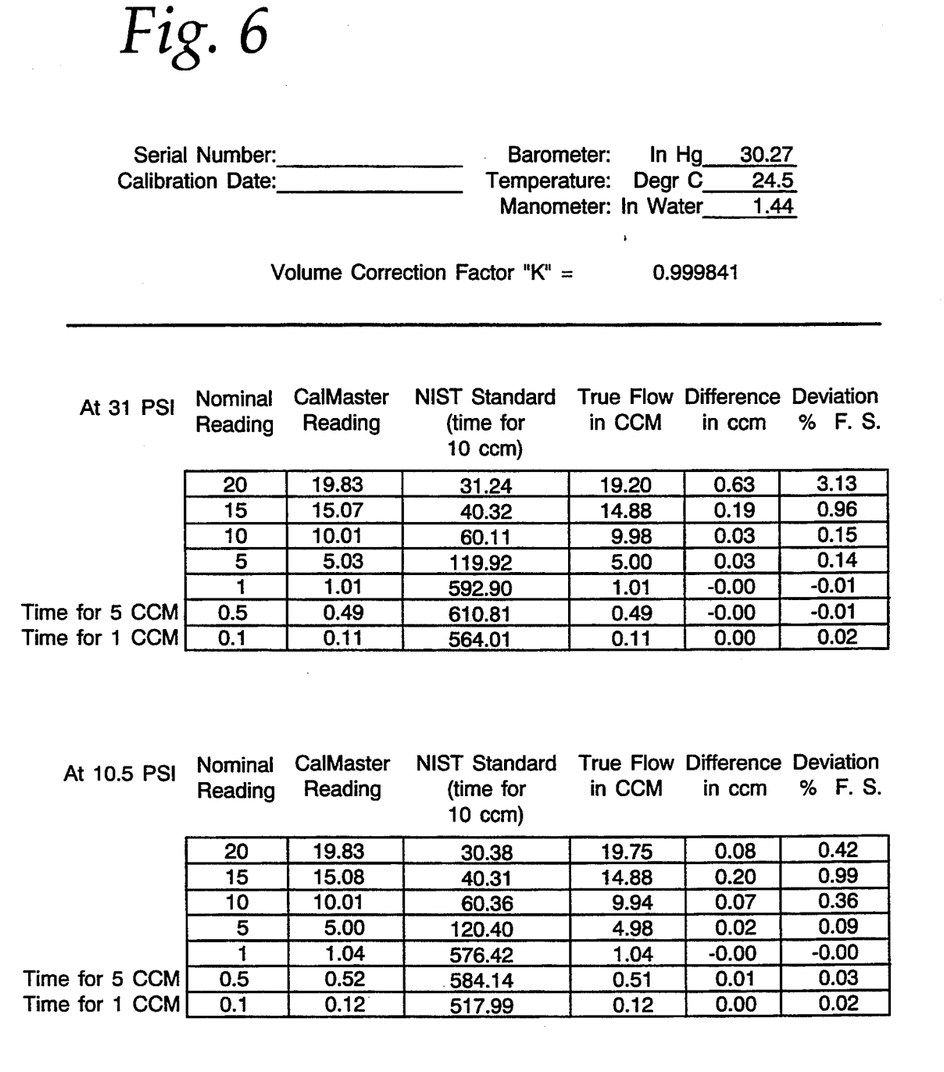
FIG. 6 illustrates a calibration chart comparing readings taken by one of the held-held devices embodied by the present invention to a flow standard traceable to the National Institute of Standards and Technology.

Although the hand-held device 50 embodied by the present invention is exceedingly accurate, it is desirable to correlate the hand-held device 50 to a flow standard traceable to the National Institute of Standards and Technology (NIST, formerly the National Bureau of Standards). Consequently, the hand-held device 50 is standardized to the traceable NIST standard as illustrated in FIG. 6. As seen in FIG. 6, a number of different flow rates are generated at different pressures and are measured with the NIST standard and the hand-held device 50. The measured flow rates for each device are compared at each measured rate of flow and the difference between the readings is determined. The chart of FIG. 6 or a calibration curve showing the difference at each rate of flow is generated and shipped with the hand-held device 50. In this way, each hand-held device generates accurate leak standards traceable to the NIST.

Figure 4:
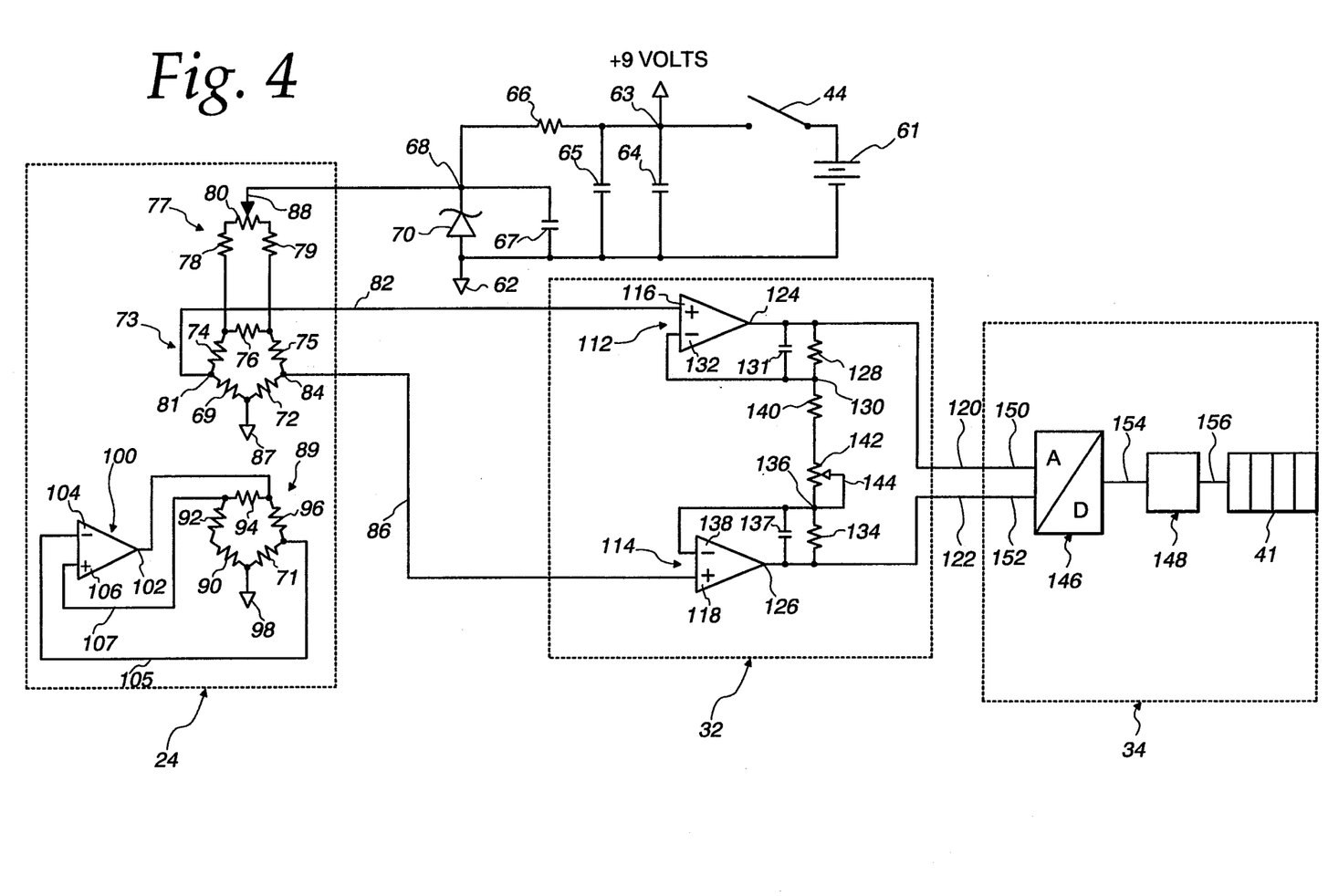
FIG. 4 is a schematic diagram of the present invention.

FIG. 4 illustrates a schematic diagram of the present invention which includes a flow transducer 24, the amplifier 32 and the display module 34. Each of these three elements 24, 32, and 34, are powered by a 9 volt battery 61. By incorporating the 9 volt battery 61 into the present invention, the present invention is an entirely self-contained and hand-held device which can be easily moved from one location to the next. An AC adapter can also be used as is well known in the art. The battery 61 has its negative terminal connected to ground potential 62. The positive terminal of the battery 61 is connected to one side of the power on/off switch 44. The other side of the power on/off switch 44 is connected to a junction 63 which is at the battery supply voltage of 9 volts when the switch 44 is closed. The junction 63 is coupled to a capacitor 64 of 0.01 $\mu$ farads and a capacitor 65 of 2.2 $\mu$ farads which provide filtering as is known by those skilled in the art. The junction 63 is also connected to a junction 68 via a resistor 66. The junction 68 is also connected to the cathode of a zener diode 70, the anode of which is connected to ground potential 62. The zener diode is a 5.1 volt zener diode for establishing a 5.1 volt potential from the 9 volt battery 61. A capacitor 67 of 0.01 $\mu$ farads is connected between the junction 68 and ground 62.

The flow transducer 24 includes a mass flow sensor sold by Microswitch, a division of Honeywell, having the name Microbridge Mass Airflow Sensor, particularly suited to measuring low flow rates. It is within the scope of the invention to use other types of flow sensors which product an electrical signal indicating flow rate.

Figure 5:
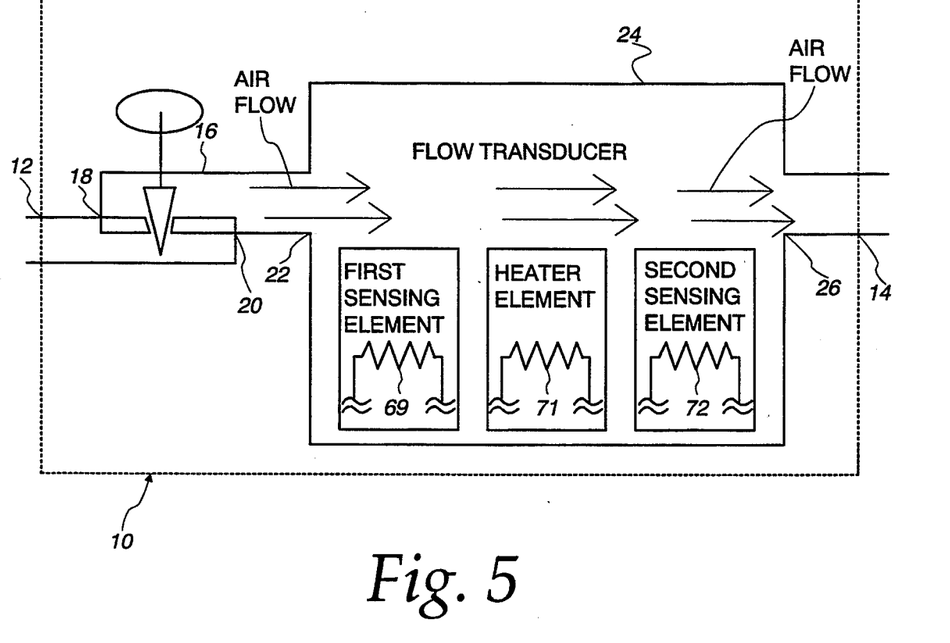
FIG. 5 is a diagram illustrating air flow through the flow sensor.

The mass flow sensor is comprised of a ceramic substrate on which are deposited a first sensing element, a second sensing element, and a heater element. As shown in FIG. 5, the first sensing element includes an upstream resistor 69. The heater element includes a heater resistor 71, and the second sensing element includes a downstream resistor 72. The resistor 69 and the resistor 72 included in the first and second sensing elements, respectively, are temperature sensitive resistors whose resistance reflects the temperature of the sensing element. The power dissipated in heater resistor 71 heats the air passing over the heater resistor 71. Air received from a pressure source connected to the inlet port 12 crosses the first sensing element, the heater element, and the second sensing element. Before the air reaches the second sensing element, however, some heat from the heater element is transferred to the air before passing over the second sensing element. The temperature variation between the first and second sensing elements gives rise to a resistance difference between the resistor 69 and the resistor 72 proportional to the air velocity.

As seen in FIG. 4, the upstream resistor 69 and the downstream resistor 72 are included in a sensor Wheatstone bridge 73. The sensor Wheatstone bridge 73 is included in the Microswitch mass flow sensor. Further included in the sensor Wheatstone bridge are resistors 74, 75, and 76. Across the resistor 76 is connected a sensing bridge supply circuit 77 consisting of a resistor 78, a resistor 79, and a zero adjust potentiometer 80. The zero adjust potentiometer 80 is adjusted by the operator through the zero adjustment means 54, as seen in FIG. 3. A junction 81, between the upstream resistor 69 and the resistor 74, is connected to an output conductor 82. The output conductor 82 carries a first signal used to determine the flow rate. A junction 84, between the downstream resistor 72 and the resistor 75, is connected to an output conductor 86, which carries a second signal from the other side of the Wheatstone bridge to determine the flow rate. The sensor Wheatstone bridge is grounded at a ground 87.

The zero adjust potentiometer 80 zeros the display 41 by adjusting the voltage difference between the junction 81 and the junction 84 when no air is flowing from the upstream resistor 69 to the downstream resistor 72. As seen in FIG. 4, a wiper 88 of the zero adjust potentiometer 80 is connected to the junction 68. The wiper 88 controls the amount of current supplied to either side of the Wheatstone bridge. The output of the device, seen on the display 34, is adjusted to display zero output when there is no air flow crossing the heater resistor 71. In general, the zero adjust potentiometer 80 is adjusted before a leak standard is established.

As previously described, the two sensing elements, upstream resistor 69 and downstream resistor 72, are located on either side of the heating element 71 of a heater control bridge 89. Heater control bridge 89 consists of resistor 71 and four additional resistors. The heater control bridge 89 is a Wheatstone bridge used to set the heating element of the heater resistor 71 to a temperature of 160° C. above the ambient temperature. An ambient temperature resistor 90 is used to sense the ambient temperature. A resistor 92 is connected to the ambient temperature resistor 90, to compensate for the nonlinear behavior of the resistor 71 and the ambient temperature resistor 90. Two resistors 94 and 96 are used to establish the temperature of this particular bridge. Resistor 94 has a value which is set equal to the resistor 71 when the resistor 71 is at 160° C. over 25° C. The resistor 96 has a value set to be equal to the value of the ambient temperature resistor 90 at 25° C. For the bridge to balance, the heater resistor 71 must dissipate enough power to heat the resistor to 160° C. over ambient temperature. A ground potential 98 grounds the bridge at a point between the resistor 90 and the resistor 71.

An operational amplifier 100 controls the power to heat the resistor 71. The operational amplifier 100 has an output 102 connected to the junction of the resistor 94 and the resistor 96, a negative input 104 connected by a conductor 105 to the junction of the resistor 96 and the resistor 71, and a positive input 106 connected by a conductor 107 to the junction of the resistor 92 and the resistor 94. The operational amplifier 100 operates from 9 volts provided by the battery 61, as would be understood by those skilled in the art. The operational amplifier 100 as well as other operational amplifiers 112 and 114 discussed later have a part number OP490GP generally available from a number of manufacturers. This operational amplifier is a quad unit package requiring a single supply, which in the present embodiment is 9 volts. Of course, other operational amplifiers may also be used. The heater temperature is maintained at a constant differential temperature above the ambient temperature under varying temperatures and air flow conditions. The heater resistor 71 provides heat to the air flow being measured.

The upstream sensing element 69 and the downstream sensing element 72 are used to detect the change in temperature of the air as it passes from the upstream sensing element over the heating element, and past the downstream sensing element. The difference in voltage between the output conductors 82 and 86 indicates the difference in temperature between the upstream resistor 69 and the downstream resistor 72. The output conductor 82 and the output conductor 86 are both connected to the amplifier 32.

The amplifier 32 receives the first signal on conductor 82 and the second signal on conductor 86 and produces two amplified signals corresponding to the received signals. The signals at conductors 82 and 86 are different if the resistance of the downstream resistor 72 is different than the resistance of the upstream resistor 69 and taking into account any balancing of the bridge made by the potentiometer 80.

The wiper 88 of the zero adjust potentiometer 80 is at the potential of the zener diode 70 of approximately 5.1 volts. This voltage level establishes an offset voltage around which the voltages at junctions 81 and 84 swing. By incorporating this phantom differential into the present invention, the voltages on the conductors 82 and 86 vary around an approximate midpoint of the battery voltage, thereby allowing the amplifier 32 to generate signals which are not limited by circuit constraints.

The amplifier 32 includes a first operational amplifier 112 and a second operational amplifier 114. The first operational amplifier 112 has a positive input 116 connected to the conductor 82. The second operational amplifier 114 has a positive input 118 connected to the conductor 86. The operational amplifiers 112 and 114 are connected in a differential-input amplifier configuration. Upon receipt of the signal from the conductor 82 at the positive input 116 of the first operational amplifier 112 and upon receipt of the signal on the conductor 86 at the positive input 118 of the operational amplifier 114, two output signals are generated: at an output conductor 120 and at an output conductor 122 of the amplifier 32. The output conductor 120 is connected to an output 124 of the first operational amplifier 112. The output conductor 122 is connected to an output 126 of the second operational amplifier 114. Each of these outputs, 124 of the operational amplifier 112 and output 126 of the operational amplifier 114, are applied to biasing circuitry which is returned to the negative input of each individual operational amplifier for purposes of feedback control.

The output 124 of the first operational amplifier 112 is connected to a resistor 128 connected to a junction 130. A capacitor 131 is connected in parallel with the resistor 128 for filtering purposes. The junction 130 is also connected to a negative input 132 of the operational amplifier 112 for purposes of negative feedback. The output 126 of the operational amplifier 114 is connected to a resistor 134 having one side connected to a junction 136. A capacitor 137 is connected in parallel with the resistor 134 for filtering purposes. The junction 136 is connected to a negative input 138 of the operational amplifier 114 for purposes of negative feedback. The junctions 130 and 136 are coupled through a resistor 140 and a span potentiometer 142.

The span potentiometer 142 has a wiper 144 for adjusting the resistance. The span potentiometer 142 adjusts the span or difference between the signals carried by the output conductors 120 and 122. As the resistance of the potentiometer 142 is decreased, the difference between the signals at the output conductors 120 and 122 increases. As the resistance of the potentiometer 142 is increased, the difference between the signals at the output conductors 120 and 122 decreases. The span potentiometer 142 is adjusted at the manufacturer. While a potentiometer is preferred here to compensate for variations in the characteristics of semiconductor devices used in the present invention, a precision resistor could also be used if variations in device characteristics are not significant. Consequently, the gain or amplification of the amplifier 32 is used as an input for controlling the digital readout 41 through other circuitry. It is also within the scope of the invention to use an amplifier producing a single output signal whose value reflects the difference in the input signals.

The present invention can be factory set for either a low range capability of 0–20 cc/m or a high range capability of 0–100 cc/m. For the low range, the values of the resistors 128, 134, 140, and 142 are respectively 10 Kohms, 10 Kohms, 750 ohms, and 100 ohms. For the high range, the values are respectively 1 Kohm, 1 Kohm, 750 ohms and 100 ohms. Of course, other ranges can be created using different values of resistance as understood by those skilled in the art.

The display module 34 is connected to the output conductors 120 and 122. The display module 34 includes an analog-to-digital (A/D) convertor 146, a binary coded decimal driver 148, and the display 41. The A/D convertor 146 has a high input 150 connected to the output conductor 120, and a low input 152 connected to the output conductor 122. The A/D convertor 146 is a dual slope analog-to-digital convertor. The A/D convertor 146 includes an output 154 connected to the binary coded decimal driver 148. The output 154 includes a number of conductors arranged in parallel for carrying the digital output of the A/D convertor 146. The parallel lines 154 are connected to the binary coded decimal decoder/driver 148, to drive the display 41, connected to a number of parallel output lines 156 of the BCD/driver 148. The present invention uses a battery operated 3½ digit LCD voltage input DPM, model no. DP-176 from Acculex, a Metrabyte company, comprising the A/D convertor 146, the driver 148, and the display 41. It is also within the scope of the invention to use a display module requiring a single input signal as opposed to the current embodiment.

The display 41 displays a measurement of flow in cubic centimeters per minute.

Thus, there has been described herein a novel calibration device for leak detecting instruments. The calibration device for leak detecting instruments includes a number of features providing an accurate, low-cost, portable calibration device. Quick readings and generation of flow rates for establishing flow standards when calibrating leak detecting instruments are an added feature. The foregoing description of the invention has been presented for purposes of illustration and description. The calibration device for leak detecting instruments has been described in combination with the typical operation of the device when used with leak detecting instruments. This description is not intended, however, to limit the invention to the precise forms disclosed. For instance, the present invention may be constructed of individual components. In addition, it is apparent that resistive values can be changed to enable the present invention to generate and measure a wide variety of flow rates. External switches could be incorporated to change the flow rate generating capability from one range of flow rates to another. Consequently, many modifications and variations are possible in light of the above teachings by those skilled in the art, as expressed in the specification and appended claims.

What is claimed is:

1. A leak detector calibration device for generating a leak standard, said leak detector calibration device comprising:

flow control valve means for controlling the flow rate of a gas;

said flow control valve means including means for adjusting the controlled flow rate of the gas;

flow transducer means for producing a signal indicating flow rate, said flow transducer means coupled to said flow control valve means to measure said controlled flow rate;

an amplifier means connected to said flow transducer means for amplifying the signal indicating flow rate;

display means for displaying the flow rate, said display means coupled to said amplifier means; and housing means for housing said flow control valve means, said flow transducer means, said amplifier means, and said display means in a singled unified package.

2. The leak detector calibration device of claim 1 wherein said housing means is sized to be held by one hand.

3. The leak detector calibration device of claim 1 wherein said means for adjusting includes locking means for locking the controlled flow rate of the gas to the adjusted flow.

4. The leak detector calibration device of claim 1 wherein said flow transducer means is a mass flow transducer.

5. The leak detector calibration device of claim 1 further comprising zero adjustment means for adjusting said display means to zero when no gas is flowing through said flow control valve means.

6. The leak detector calibration device of claim 1 wherein said display means includes conversion means for converting the amplified signal to a display signal for display on said display means.

7. The leak detector calibration device of claim 6 wherein said flow transducer means includes bridge means for generating a first signal and a second signal wherein the difference between the first signal and the second signal indicates flow rate.

8. The leak detector calibration device of claim 7 wherein said amplifier means is a differential-input amplifier.

9. The leak detector calibration device of claim 8 wherein said amplifier means includes a first output conductor and a second output conductor wherein said first output conductor carries an amplified first signal of the first signal generated by said flow transducer means and said second output conductor carries an amplified second signal of the second signal generated by said flow transducer means.

10. The leak detector calibration device of claim 9 wherein said amplifier means includes span adjusting means for adjusting the difference between the amplified signal carried on said first output conductor and the amplified signal carried on said second output conductor.

11. The leak detector calibration device of claim 10 wherein said conversion means includes digital conversion means for converting said amplified first signal and said amplified second signal to a plurality of digital signals representing the difference between said amplified first signal and said amplified second signal.

12. The leak detector calibration device of claim 11 wherein said conversion means includes a binary coded decimal conversion means for converting said plurality of digital signals to a plurality of binary coded decimal signals representing said plurality of digital signals.

13. The leak detector calibration device of claim 12 wherein said binary coded decimal conversion means is coupled to said display means.

14. The leak detector calibration device of claim 13 wherein said device is battery powered.

15. A leak detector calibration device for generating a leak standard, said leak detector calibration device comprising:
   an inlet port for coupling a positive pressure source allowing the calibration device to generate a leak standard therefrom, the positive pressure source being connectable to a leak detector for measurement of the generated leak;
   means for controlling the flow rate of gas coupled to said inlet port providing gas flow therethrough to generate the leak standard for measurement by the leak detector;
   said controlling means comprising means for adjusting the control flow rate of gas;
   means for transducing the flow rate of gas through said inlet port producing a signal indicative of the flow rate, said transducing means being coupled to said controlling means;
   means for amplifying connected to said transducing means for amplifying the signal indicating flow rate;
   means for displaying the flow rate, said display means being responsive to the amplified signal; and
   housing means for housing said inlet port, said controlling means, said transducing means, said amplifying means and said display means in a single hand-held housing.

16. A device in accordance with claim 15 further comprising:
   an outlet port for coupling to a negative pressure source creating a vacuum thereat, said outlet port being connected to said transducing means;
   said controlling means providing a vacuum leak generating a leak standard for measurement by the leak detector; and
   said housing means housing said outlet port.

17. A device in accordance with claim 16 wherein said adjusting means comprises means for locking the control flow rate of gas to the adjusted flow.

* * * * *

UNITED STATES PATENT AND TRADEMARK OFFICE
CERTIFICATE OF CORRECTION

PATENT NO. : 5,363,689
DATED : November 15, 1994
INVENTOR(S) : Jacques E. Hoffmann and David J. Balke It is certified that error appears in the above-indentified patent and that said Letters Patent is hereby corrected as shown below:

Column 2, Face page, line 10 of the Abstract, change "present" to --presently--.

Column 10, line 16, change "singled" to --single--.

Signed and Sealed this

Sixth Day of June, 1995

Attest:

BRUCE LEHMAN

*Attesting Officer*     *Commissioner of Patents and Trademarks*